SYNCHRONIZER FOR DIGITAL COUNTERS

Filed July 16, 1965

INVENTOR.
ROBERT H. SAPP
BY
ATTORNEYS

United States Patent Office 3,420,989

Patented Jan. 7, 1969

3,420,989

SYNCHRONIZER FOR DIGITAL COUNTERS

Robert H. Sapp, Baltimore, Md., assignor, by mesne assignments, to the United States of America as represented by the Secretary of the Navy Filed July 16, 1965, Ser. No. 472,744

U.S. Cl. 235—92 2 Claims

Int. Cl. G06f *3/00;* H03k *17/00*

ABSTRACT OF THE DISCLOSURE

A synchronizer for causing a counter to operate in a fixed sequence with respect to a computer system includes a source of sample pulses, a source of count pulses unsynchronized with the sample pulses and a memory device set by the count pulses suitably connected so that when the memory device is set, a sample pulse will step the counter and reset the memory device.

In digital systems it is often times necessary to use a counter which operates in such a fashion that it is not simply related to the system timing. When the counter is operating in such a manner, it is essential that the state of the counter is not changing while its output is being accessed, i.e., it is desirable that the counter operate in a fixed sequence with respect to the system. Therefore, the counter with a fixed relationship to the system is desired. A direct method of achieving this is to use a clocked system with a parallel counter which will change state at the system clock rate. However, a considerable hardware saving can be had if an unclocked system with a serial counter is used.

An object of the present invention is to provide an improved and simplified computer apparatus.

Another object of the present invention is to provide an improved and simplified synchronizer for digital counters.

A further object of the invention is to provide a synchronizer for digital serial counters.

An additional object of the present invention is to provide a synchronizer which allows the use of serial counters in a digital system.

Other objects and many of the attendant advantages of this invention will be readily appreciated as the same becomes better understood by reference to the following detailed description when considered in relation with the figures wherein.

The present invention allows the use of serial counters in applications wherein a counter is operating in a manner which is not simply related to system timing. The only proviso is that the maximum stepping frequency of the counter be known. The technique utilized involves setting a memory device, with the count pulse. When the memory device is set, a sample pulse will step the counter and reset the memory device.

Figure 1:
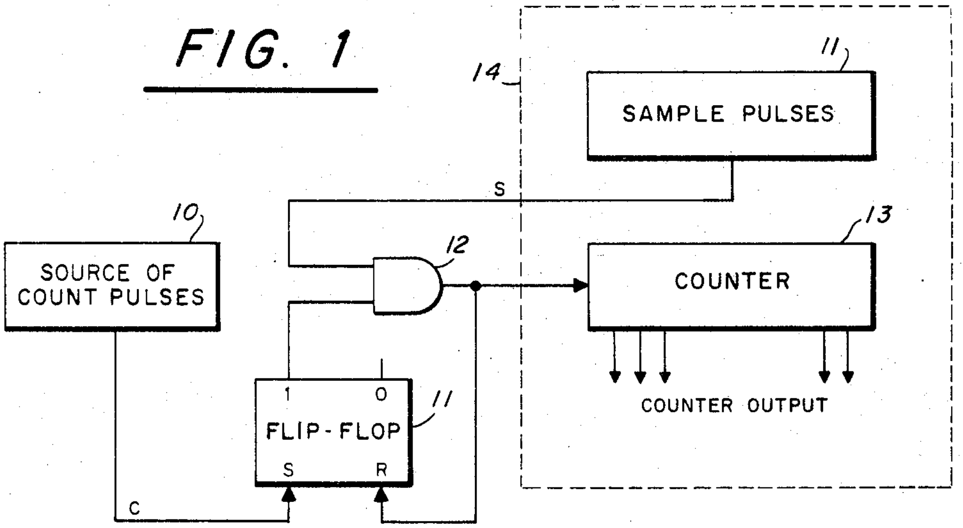
FIG. 1 is a block diagram of the embodiment of the invention.

FIG. 1 illustrates the preferred embodiment of the invention wherein a source of count pulses 10, is shown, which has an output labeled C, corresponding to count pulses. Output C is coupled to the "set" side of a flip-flop 11 having its "1" output connected as one input to an AND gate 12. The output of AND gate 12 is coupled back to the "reset" input of flip-flop 11. In addition, AND gate 12 receives another input, labeled S, from a source of sample pulses 11 which are synchronized from system timing. The system is indicated as being contained within dotted line enclosure 14. Also contained within the system 14 is a counter 13 which in the present embodiment is a serial counter. The serial counter 13 receives an input from the AND gate 12 and also has outputs from the registers comprising the counter.

In operation, count pulse from the count pulse source 10, which is being sampled, will set flip-flop 11 to a "1." This will enable AND gate 12 so that when the first sample pulse from the source of sample pulses 11 appears an output from AND gate 12 will result. The output from the AND gate 12 is coupled to counter 13 which will step the counter and simultaneously reset flip-flop 11. The counter output will be available between the times allowed for propagation delay.

Figure 2:
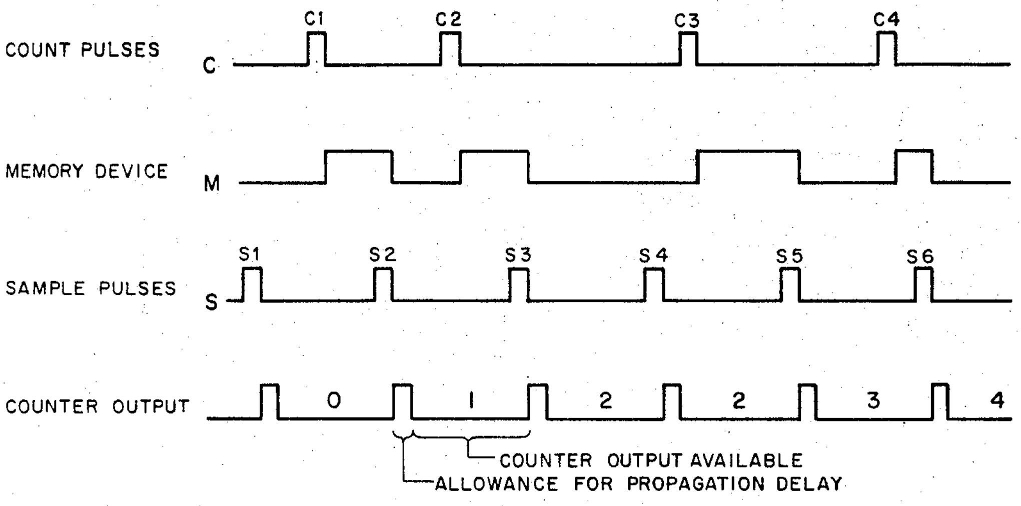
FIG. 2 is a system timing diagram.

FIG. 2 illustrates the timing sequence for the block diagram of FIG. 1. In FIG. 2, sample pulses are occurring at times S1 through S6 which are synchronized with system timing and occur at regular clock intervals. The count pulses C1 through C4 may occur at any time as indicated by the staggered spacing between the count pulses. The memory device, i.e., flip-flop 11 is set by pulse C1, for instance. The next sample pulse S2 advances the counter 13 and as soon as the counter settles the counter output is available for accessing as indicated by the number 1 on the line labeled "Counter Output." Pulse S2 also resets the memory device 11. In sequence, the next count pulse C2 sets flip-flop 11 and succeeding sample pulse S3 steps the counter to state 2 and resets flip flop 11. If a sample pulse such as S4 occurs when the memory device is in the reset condition the counter remains quiescent, i.e., is not stepped and remains in count 2, as shown. However, the succeeding count pulse C3 will set the flip-flop 11 and therefore sample pulse S5 will step the counter 13 to state 3, etc.

Through the use of the system as set forth in FIG. 1 the use of a parallel counter involving a clocked system, i.e., a counter with a fixed relation to the system is obviated. Instead, a serial counter which is locked or synchronized to system timing and only counts in accordance with the unsynchronized count pulses is provided which allows a considerable hardware saving.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A synchronizer causing digital counters to operate in a fixed sequence with respect to a computer system comprising;

a source of sample pulses which are synchronized with the computer system timing;

said source of sample pulses having an output;

an input adapted to receive a source of count pulses which are unsynchronized with respect to computer system timing;

memory means operatively receiving an input corresponding to the count pulses unsynchronized with the computer system;

said memory means having an output;

gating means having inputs and an output;

one of said inputs to said gating means being operatively coupled to the source of sample pulses synchronized with computer system timing;

the other of said inputs to said gating means comprising the output of said memory device;

said gating means producing an output only when sample pulses and count pulses are present simultaneously; and serial counter means operatively connected to the output of said gating means for counting whenever a pulse is present at the output of the gating means.

2. A synchronizer for digital counters as set forth in claim 1 wherein;

said memory means comprises a bistable flip-flop having a set and reset input and an output which varies between two states;

one of said set and reset inputs operatively receiving unsynchronized count pulses;

the other of said set and reset inputs being operatively connected to the output of said gating means;

said bistable flip-flop producing an output when count pulses are present at one of said set and reset inputs.

References Cited

UNITED STATES PATENTS

| | | | |
|---|---|---|---|
| 3,091,737 | 5/1963 | Tellerman | 328—72 |
| 3,225,301 | 12/1965 | McCann | 328—72 X |
| 3,226,648 | 12/1965 | Davidson | 328—72 |
| 3,292,034 | 12/1966 | Braaten | 328—72 |

MAYNARD R. WILBUR, *Primary Examiner.*

GREGORY J. MAIER, *Assistant Examiner.*

U.S. Cl. X.R.

328—72